(12) United States Patent
Li et al.

(10) Patent No.: US 12,180,419 B2
(45) Date of Patent: Dec. 31, 2024

(54) ALKYLANILINE POLYETHER BENZENESULFONATE AND PROCESS OF PRODUCING SAME

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Yingcheng Li, Shanghai (CN); Xinning Bao, Shanghai (CN); Weidong Zhang, Shanghai (CN); Ou Sha, Shanghai (CN); Xinyue Wu, Shanghai (CN); Jun Jin, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 64 days.

(21) Appl. No.: 18/003,395

(22) PCT Filed: Jul. 2, 2021

(86) PCT No.: PCT/CN2021/104139
§ 371 (c)(1),
(2) Date: Dec. 27, 2022

(87) PCT Pub. No.: WO2022/002226
PCT Pub. Date: Jan. 6, 2022

(65) Prior Publication Data
US 2023/0242806 A1 Aug. 3, 2023

(30) Foreign Application Priority Data
Jul. 2, 2020 (CN) .......................... 202010624678.2

(51) Int. Cl.
*C09K 8/584* (2006.01)
*C08G 65/26* (2006.01)
*C08G 65/326* (2006.01)
*C09K 8/588* (2006.01)

(52) U.S. Cl.
CPC .......... *C09K 8/584* (2013.01); *C08G 65/2627* (2013.01); *C08G 65/326* (2013.01); *C09K 8/588* (2013.01)

(58) Field of Classification Search
CPC ........ C09K 8/035; C09K 8/584; C09K 8/588; C08G 65/2627; C08G 65/326; C07C 309/49
See application file for complete search history.

(56) References Cited

U.S. PATENT DOCUMENTS

| | | | | |
|---|---|---|---|---|
| 3,578,781 A | * | 5/1971 | Abrams | C09K 8/607 166/305.1 |
| 7,341,983 B2 | * | 3/2008 | Pedersen | A61P 31/04 510/499 |

FOREIGN PATENT DOCUMENTS

| | | |
|---|---|---|
| CN | 1203935 A | 1/1999 |
| CN | 1426833 A | 7/2003 |
| CN | 1458219 A | 11/2003 |
| CN | 1566258 A | 1/2005 |
| CN | 101054514 A | 10/2007 |
| CN | 101279935 A | 10/2008 |
| CN | 103571220 A | 2/2014 |
| CN | 105368426 A | 3/2016 |
| CN | 105441054 A | 3/2016 |
| CN | 109679612 A | 4/2019 |
| CN | 109681175 A | 4/2019 |
| CN | 110791273 A | 2/2020 |
| EA | 012603 B1 | 10/2009 |
| IN | 100386402 C | 5/2008 |
| RU | 2668104 C1 | 9/2018 |

* cited by examiner

*Primary Examiner* — Aiqun Li
(74) *Attorney, Agent, or Firm* — NKL Law; Allen Xue

(57) ABSTRACT

A process for the conversion of methanol to olefins includes the steps of passing a feedstock comprising methanol to a fluidized bed reactor in contact with a catalyst to produce an olefin product, wherein the process at least partially deactivates the catalyst to form an at least partially deactivated catalyst; and passing spent catalyst from said at least partially deactivated catalyst to a regenerator for regeneration thereby forming regenerated catalyst and returning activated catalyst from said regenerated catalyst to said reactor via a regenerated catalyst line. An oxygen volume content in the gas-phase component at the outlet of the regenerated catalyst pipeline is controlled to be less than 0.1 percent, preferably less than 0.05% and more preferably less than 0.01% on the regenerated catalyst pipeline.

20 Claims, No Drawings

ALKYLANILINE POLYETHER BENZENESULFONATE AND PROCESS OF PRODUCING SAME

TECHNICAL FIELD

The invention relates to the field of surfactants, and particularly to enhanced oil recovery surfactant containing alkyl polyether aminobenzenesulfonate.

BACKGROUND

After decades of exploitation, many oil fields entered a high water-content stage, the yield is being reduced, and the development of tertiary oil recovery is becoming an important way for improving oil recovery. Tertiary oil recovery is called compared with primary oil recovery and secondary oil recovery. Generally speaking, in the initial stage of oil exploitation, only the natural energy of the stratum is used for exploiting the oil, which is called primary oil exploitation, and the oil recovery is only about 10%. Methods for recovering oil by replenishing the formation with energy, such as water injection, are known as secondary recovery. At present, a large number of oil fields in the world adopt a secondary oil recovery method, but the oil recovery can only reach about 25% to 40% generally. The tertiary oil recovery is a method for continuously exploiting residual underground petroleum by means of physical, chemical and biological means, thereby improving the recovery rate of crude oil. Chemical flooding is a very important and large-scale implementation of technology in enhanced oil recovery. The effect of chemical flooding is the result of both physical action and chemical action, wherein the physical action denotes the sweeping action of the flooding fluid, and the chemical action denotes the microscopic flooding action of the flooding fluid, for which the key chemical agent is the surfactant.

The main mechanism for the surfactant to improve the crude oil recovery comprises: reducing the interfacial tension of the flooding fluid and the crude oil, and improving the wettability of the oil reservoir. After an oil field enters a high water-content period, residual oil is trapped in pores of reservoir rocks in a discontinuous oil film, which are affected by viscous force and capillary force. The interfacial tension between oil and water will be reduced with proper surfactants. The interfacial tension between oil and water in the oil reservoir could be reduced from 20-30 mN/m to an ultralow value ($10^{-3}$-$10^{-4}$ mN/m). When the interfacial tension reaches ultra-low, the oil droplet flow resistance decreases and the residual oil mobility is improved, as a result oil displacement efficiency will be greatly improved. Surfactants can also change the oil-wet rock surface into water-wet or neutral wet, which reduce the adhesion of crude oil in the reservoir, so that crude oil can be easily took off from the rock surface, and improve the efficiency of oil displacement.

At present, most of the surfactants for tertiary oil recovery are salts of petroleum sulfonate, alkyl benzenesulfonate, higher-alkyl benzenesulfonate, olefin sulfonate and other surfactants (CN 1203935A, CN1566258A, CN 1426833A), and the surfactants have the characteristics of economic advantages and easy to get. However, these surfactants also have many disadvantages such as poor salt tolerance (particularly, resistance to divalent cations), and cannot be applied to high-temperature and high-salinity reservoir. At present, these surfactants are mainly applied to common oil reservoirs (CN 1458219A), because salt tolerance and the temperature resistance of these surfactants are insufficient for high-temperature and high-salinity oil reservoirs.

Therefore, the development of novel high-efficiency surfactants is of great importance to the enhanced oil recovery industry.

SUMMARY OF THE INVENTION

The invention provides an alkyl polyether aminobenzenesulfonate, which has high interfacial activity and shows promising in enhanced oil recovery.

In order to overcome the problems in the prior art, the present invention provides a novel salt of alkyl polyether aminobenzenesulfonate which can be used to enhance oil recovery, either alone or in a mixture. The alkyl polyether aminobenzenesulfonate used as enhanced oil recovery surfactant has the advantages of high interfacial activity and ultralow interfacial tension at a level of $10^{-3}$ mN/m under the conditions of alkali-free and high salinity, so that the crude oil recovery can be improved.

One of the purposes of the invention is to provide an alkyl polyether aminobenzenesulfonate, which has a structure shown in a formula (I):

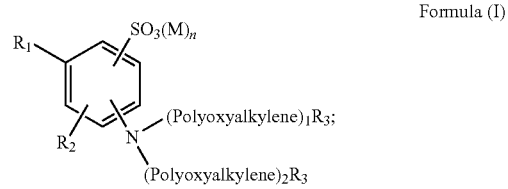

Formula (I)

in formula (I): $R_1$ and $R_2$ are independently selected from the group consisting of H, $C_1$-$C_{40}$ hydrocarbyl group or

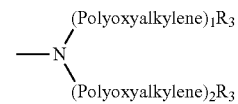

and are not both H; $R_3$ is independently selected at each occurrence from the group consisting of H, $C_1$-$C_{10}$ hydrocarbyl group, $C_1$-$C_{10}$ carbonyl group, $C_1$-$C_{10}$ alkylsulfonic group, $C_1$-$C_{10}$ alkylolsulfonic group, $C_1$-$C_{10}$ alkylcarboxylic group, and —$SO_3(M)_n$; -(Polyoxyalkylene)$_1$- is one or a combination of several of —(PO)$_{x1}$—, -(EO)$_{y1}$—, —(BO)$_{z1}$—; -(Polyoxyalkylene)$_2$- is one or a combination of several of —(PO)$_{x2}$—, -(EO)$_{y2}$—, —(BO)$_{z2}$—; $x_1$, $x_2$, $y_1$, $y_2$, $z_1$, and $z_2$ are each independently selected from any integer between 0 and 50, and $x_1$+$x_2$=0-50, $y_1$+$y_2$=1-50, and $z_1$+$z_2$=0-50; M is selected from alkali metals and alkaline earth metals, for which n is 1 when M is an alkali metal, and n is 0.5 when M is an alkaline earth metal; and wherein PO is propoxy, EO is ethoxy, and BO is butoxy.

In a preferred embodiment, in formula (I), $R_1$ is a $C_6$-$C_{30}$ hydrocarbyl group, preferably $R_1$ is a $C_6$-$C_{30}$ alkyl or alkenyl group, $R_2$ is H, a $C_1$-$C_{30}$ hydrocarbyl group or

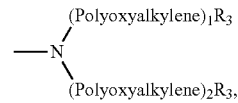

and $R_3$ is independently at each occurrence H, —$CH_3$, —$CH_2CH_3$, —$CH_2SO_3(M)_n$, —$CH_2(CHOH)SO_3(M)_n$-(—$CH_2COO(M)_n$- or —$SO_3(M)_n$, $x_1+x_2$=0-30, $y_1+y_2$=1-30, $z_1+z_2$=0-30.

In a further preferred embodiment, in formula (I), $R_1$ is a $C_6$-$C_{20}$ hydrocarbyl group, preferably $R_1$ is a $C_6$-$C_{20}$ alkyl or alkenyl group; $R_2$ is a $C_1$-$C_{30}$ hydrocarbyl group; $R_3$ is independently selected at each occurrence from H, —$CH_3$ and —$CH_2CH_3$; $x_1+x_2$=0-20, preferably $x_1+x_2$=1-10, or preferably $x_1+x_2$=2-10; $y_1+y_2$=1-20, preferably $y_1+y_2$=2-20; $z_1+z_2$=0-20, preferably $z_1+z_2$=1-10, or preferably $z_1+z_2$=2-10; and M is selected from sodium ion, potassium ion, calcium ion and magnesium ion.

In a preferred embodiment, in formula (I), $R_1$ or $R_2$ is

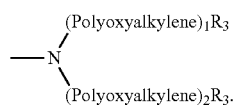

In a preferred embodiment, in formula (I), each occurrence of $R_3$ is the same.

In a preferred embodiment, in formula (I), $R_3$ is —$SO_3(M)_n$, preferably, each M appearing in formula (I) is the same.

The polyether chain in the structure of the surfactant is connected with the benzene ring through an N atom, and meanwhile, the hydrophobic long chains ($R_1$ and $R_2$) are also directly connected with the benzene ring, so that the surfactant has a special structure, and experiments show that the special structure can bring excellent effects.

Another purpose of the present invention to provide a surfactant composition comprising one or more of the alkyl polyether aminobenzenesulfonates as described above.

Another purpose of the invention is to provide a process of producing the alkyl polyether aminobenzenesulfonate, comprising the steps of:

Step 1, reacting an alkylaniline serving as an initiator with an epoxy compound, and optionally performing a blocking treatment after the reaction is finished, to obtain an alkylaniline polyether;

Step 2, sulfonating the alkylaniline polyether, to obtain the alkyl polyether aminobenzenesulfonate.

Preferably, the alkylaniline has a formula of: —$R_1$-Ph-$NH_2$, wherein Ph represents phenyl and $R_1$ is as defined in any one of claims 1 to 4.

In step 1, the alkylaniline may be purchased directly or may be prepared, for example: optionally, step 1' and step 1" being carried out before step 1:

Step 1', taking alkylbenzene as a raw material, and carrying out nitration treatment to obtain an alkyl nitrobenzene;

Step 1", carrying out hydrotreatment on the alkyl nitrobenzene to obtain the alkylaniline.

In a preferred embodiment, in step 1', the alkylbenzene is subjected to the nitration treatment with a nitrating agent selected from at least one of nitric acid and dinitrogen pentoxide, and optionally with an activator selected from at least one of concentrated sulfuric acid, glacial acetic acid, acetic anhydride and phosphorus pentoxide.

In a further preferred embodiment, the molar ratio of the nitrating agent to alkylbenzene is (1-5): 1, preferably (1-3): 1.

In a still further preferred embodiment, the nitration treatment of step 1' is carried out at 0-80° C. for 1-10 hours, preferably at 20-65° C. for 2-8 hours.

In a preferred embodiment, in step 1", the hydrotreatment is carried out in the presence of a hydrogenation catalyst selected from at least one of palladium on carbon and Raney nickel.

In a further preferred embodiment, the ratio of the amount of the alkyl nitrobenzene to the amount of the hydrogenation catalyst is 0.1 wt % to 10 wt %, preferably 1.0 wt % to 5.0 wt %.

In a preferred embodiment, the hydrotreatment of step 1" is carried out at 20 to 150° C. under 0 to 5 MPa, preferably at 60 to 110° C. under 0.5 to 4 MPa.

In a preferred embodiment, in step 1, the epoxy compound is selected from $C_2$-$C_6$ epoxy compounds, preferably from propylene oxide and/or ethylene oxide.

Preferably, in step 1, reactions with propylene oxide and ethylene oxide are carried out sequentially.

In a further preferred embodiment, in step 1, the molar ratio of the epoxy compound to the alkylaniline is (1-60):1, preferably (2-25): 1.

In a preferred embodiment, step 1 is carried out in the presence of a basic catalyst.

In a further preferred embodiment, the basic catalyst is selected from at least one of alkali metals, alkali metal hydroxides, alkaline earth metal hydroxides, alkali metal alcoholates, alkali metal oxides, preferably from alkali metal hydroxides and/or alkaline earth metal hydroxides.

In a further preferred embodiment, the amount of the basic catalyst is 0.1 wt % to 10 wt %, preferably 0.5 wt % to 5.0 wt %.

In a preferred embodiment, in step 1, the reaction conditions comprise: a reaction temperature of 140-200° C., and a reaction pressure of 0-5 MPa.

In a further preferred embodiment, in step 1, the reaction conditions comprise: a reaction temperature of 140-160° C., and a reaction pressure of 0.2-2 MPa.

In a preferred embodiment, in step 1, the blocking agent is selected from R'$_3$—X or R"$_3$—X'—R"$_3$, wherein R'$_3$ is a $C_1$-$C_{10}$ hydrocarbyl group or $C_1$-$C_{10}$ carbonyl group, preferably R'$_3$ is a $C_1$-$C_{10}$ alkyl, alkenyl or phenylalkyl group; X is selected from halogens or hydroxyl, in which when X is hydroxyl, R'$_3$ is $C_1$-$C_{10}$ carbonyl; R"$_3$ is selected from $C_1$-$C_{10}$ carbonyl and X' is selected from O.

In a further preferred embodiment, in step 1, the blocking agent is selected from at least one of methyl iodide, ethyl iodide, propyl iodide, vinyl iodide, toluene iodide, acetic acid, acetic anhydride, acetyl chloride, and benzoyl chloride.

In a further preferred embodiment, the molar ratio of the blocking agent to the alkylaniline is (2-2.6): 1, preferably (2.04-2.4): 1.

In a preferred embodiment, in step 3, the unreacted alkylaniline and epoxy compound in the reaction system are removed before the blocking treatment, and the removing treatment is preferably performed at 80 to 110° C., and preferably at 80 to 110° C. under vacuum or under nitrogen bubbling.

In a preferred embodiment, in step 2, the sulfonation treatment is performed using a sulfonating agent selected from at least one of concentrated sulfuric acid, fuming sulfuric acid, and sulfur trioxide.

In a further preferred embodiment, in step 2, the molar ratio of the alkylaniline polyether to the sulfonating agent is 1:(1-8), preferably$_1$ 1:(1-5).

In a further preferred embodiment, step 2 comprises the sub-steps of:

Step 2-1, mixing the alkylaniline polyether with a sulfonating agent, and carrying out sulfonation reaction for 0.5-10 hours at 20-80° C.;

Step 2-2, adjusting the pH value to 10-14, and performing hydrolysis reaction for 0.5-5 hours, to obtain the alkyl polyether aminobenzenesulfonate surfactant.

In a preferred embodiment, the sulfonation reaction of step 2-1 is carried out at 30-60° C. for 1-3 hours.

The alkyl polyether aminobenzenesulfonate used as an oil-flooding surfactant can show good surface and interface activities and good salt resistance, can form low interfacial tension on an oil-water interface, and thus is useful for chemical flooding enhanced oil recovery, and has wide application prospect and practical significance.

Another purpose of the invention is thus to provide an enhanced oil recovery agent composition, comprising the alkyl polyether aminobenzenesulfonate according to the present invention, a surfactant composition containing the alkyl polyether aminobenzenesulfonate or an alkyl polyether aminobenzenesulfonate obtained by the process disclosed by the invention, and water, wherein the weight ratio of the surfactant to the water is 1:(50-2000) by parts, preferably 1:(80-500) by parts.

In a preferred embodiment, the water is selected from one or more of formation water with a total salinity in the range of 0-80000 mg/L, such like oilfield injection water, formation water, seawater, rainwater and river water, and is preferably formation water with a total salinity in the range of 1000-50000 mg/L and/or seawater.

Among others, in consideration of construction convenience, water resource saving, etc., seawater is more preferable. For example, seawater from Yellow Sea is used in the Examples of the present invention, and the composition is shown in table 1. In order to increase oil displacement efficiency, the enhanced oil recovery agent of the invention can also comprise additives commonly used in the field, such as small molecular alcohols, DMSO, diethanolamine, CTAC and the like.

A further purpose of the invention is to provide use of the alkyl polyether aminobenzenesulfonate or the oil displacement agent composition in improving the recovery ratio of crude oil.

In a preferred embodiment, the process for enhancing oil recovery using the surfactant or the composition comprises: injecting the oil displacement agent composition into a crude oil formation to flood crude oil.

Thus, the invention provides, for example, embodiments of the following aspects:

1. An oil-flooding surfactant of alkyl polyether aminobenzenesulfonate having a structure shown as a formula (II):

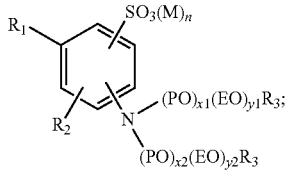

Formula (II)

in the formula (II), $R_1$ and $R_2$ are independently selected from H, $C_1$-$C_{40}$ hydrocarbyl group or $-N((PO)_{x1}(EO)_{y1}R_3)_2$ and are not H at the same time, $R_3$ is selected from H, $C_1$-$C_{10}$ hydrocarbyl group, alkyl sulfonate, alkyl alcohol sulfonate, acetate or $-SO_3(M)_n$, $x_1+x_2$=0-50, $y_1+y_2$=1-50, and M is selected from any one of alkali metal and alkaline earth metal, in which n is 1 when M is alkali metal, and n is 0.5 when M is alkaline earth metal.

The structure of formula (II) according to the present invention is a preferred embodiment of the structure of formula (I) according to the present invention.

2. The oil-flooding surfactant of alkyl polyether aminobenzenesulfonate according to aspect 1, characterized in that in formula (II), $R_1$ is $C_6$-$C_{30}$ hydrocarbyl, $R_2$ is H, $C_1$-$C_{30}$ hydrocarbyl or $-N((PO)_{x1}(EO)_{y1}R_3)_2$, $R_3$ is H, $-CH_3$, $-CH_2CH_3$, $-CH_2SO_3(M)_n$, $-CH_2(CHOH)SO_3(M)_n$, $-CH_2COO(M)_n$ or $-SO_3(M)_n$, $x_1+x_2$=0-30, and $y_1+y_2$=1-30.

3. The enhanced oil recovery surfactant of alkyl polyether aminobenzenesulfonate according to aspect 1 or 2, in formula (II), $R_1$ is $C_6$-$C_{20}$-hydrocarbyl, $R_2$ is H or $C_1$-$C_{30}$-hydrocarbyl, $R_3$ is selected from H, $-CH_3$ or $-CH_2CH_3$, $x_1+x_2$=0-20, $y_1+y_2$=1-20, and M is selected from any one of sodium ion, potassium ion, calcium ion or magnesium ion.

4. A process of producing the enhanced oil recovery surfactant of alkyl polyether aminobenzenesulfonate in one of aspect 1-3, comprising the steps of:

Step 1, reacting alkylaniline serving as an initiator with an epoxy compound, and optionally performing blocking treatment after the reaction is finished, to obtain alkylaniline polyether;

Step 2, sulfonating the alkylaniline polyether, to obtain the enhanced oil recovery surfactant of alkyl polyether aminobenzenesulfonate.

5. The process according to aspect 4, characterized in that step 1' and step 1" are optionally performed before step 1:

Step 1', taking alkylbenzene as a raw material, and carrying out nitration treatment, to obtain alkyl nitrobenzene;

Step 1", carrying out hydrotreatment on the alkyl nitrobenzene, to obtain the alkylaniline.

6. The process according to aspect 5, characterized in that in step 1', alkylbenzene is subjected to nitration treatment with a nitrating agent selected from at least one of nitric acid and dinitrogen pentoxide, and optionally an activator selected from at least one of concentrated sulfuric acid, glacial acetic acid, acetic anhydride, and phosphorus pentoxide.

7. The process according to aspect 6, characterized in that,
the molar ratio of the nitrating reagent to alkylbenzene is (1-5): 1, preferably (1-3): 1; and/or
the nitration treatment of Step 1' is carried out at 0-80° C. for 1-10 hours, preferably at 20-65° C. for 2-8 hours.

8. The process according to the aspect 5, characterized in that, in step 1", the hydrotreatment is performed in the presence of a hydrogenation catalyst selected from at least one of palladium on carbon and Raney nickel; and/or
the dosage ratio of the alkyl nitrobenzene to the hydrogenation catalyst is 0.1-10 wt %, preferably 1.0-5.0 wt %; and/or
the hydrotreatment described in step 1" is carried out at 20 to 150° C. under 0 to 5 MPa, preferably at 50 to 110° C. under 0.5 to 4 MPa.

9. The process according to aspect 4, characterized in that,
in step 1, the epoxy compound is selected from $C_2$-$C_6$ epoxy compounds, preferably propylene oxide and/or ethylene oxide; and/or
in step 1, the molar ratio of the epoxy compound to the alkylaniline is (1-60): 1, preferably (2-25): 1; and/or
step 1 is carried out in the presence of a basic catalyst; preferably, the basic catalyst is selected from at least one of alkali metal, alkali metal hydroxide, alkaline earth metal hydroxide, alkali metal alcoholate, alkali metal oxide; more preferably, the amount of the basic catalyst is 0.1 wt % to 10 wt %, preferably 0.5 wt % to 5.0 wt %;
in step 1, the reaction conditions comprise: a reaction temperature of 140-200° C., and a reaction pressure of 0-5 MPa.

10. The process according to aspect 4, characterized in that, in step 1, the blocking agent is selected from the group consisting of $R_4$—X and $R_5$—X, wherein X is selected from the group consisting of halogens, hydroxyl group or acyl group, preferably, the blocking agent is selected from at least one of halogenated hydrocarbon, organic acid, acid anhydride group-containing compound and acid halide group-containing compound; more preferably, the blocking agent is selected from at least one of methyl iodide, ethyl iodide, propyl iodide, vinyl iodide, toluene iodide, acetic acid, acetic anhydride, acetyl chloride and benzoyl chloride; and the molar ratio of the blocking agent to the alkylaniline is preferably (2-2.6): 1, and preferably (2.04-2.4): 1.

11. The process according to any one of aspects 4 to 10, characterized in that,
in step 2, the sulfonation treatment is performed using a sulfonating agent selected from at least one of concentrated sulfuric acid, fuming sulfuric acid, and sulfur trioxide.

12. The process according to the aspect 11, characterized in that the step 2 comprises the substeps of:
Step 2-1, mixing the alkylaniline polyether with a sulfonating agent, and carrying out sulfonation reaction at 20-80° C. for 0.5-10 hours;
Step 2-2, adjusting the pH value to 10-14, and performing hydrolysis reaction for 0.5-5 hours, to obtain the alkyl polyether aminobenzenesulfonate surfactant.

13. An oil-flooding agent composition, comprising the alkyl polyether aminobenzenesulfonate surfactant in one of aspects 1-3 or the alkyl polyether aminobenzenesulfonate surfactant obtained by the process in one of aspects 4-12 and water, wherein the weight ratio of the surfactant to the water is 1:(50-2000) by parts, and preferably 1:(80-500) by parts.

14. Use of the alkyl polyether aminobenzenesulfonate surfactant in one of aspects 1-3 or the oil displacement agent composition in aspect 13 in improving the recovery of crude oil.

Compared with the prior art, the invention has the following beneficial effects:
(1) The enhanced oil recovery surfactant containing the alkyl polyether aminobenzenesulfonate is a novel anionic and nonionic sulfonate surfactant and has the advantage of high interfacial activity;
(2) The enhanced oil recovery surfactant containing the alkyl polyether aminobenzenesulfonate has the advantages of high interfacial activity and ultralow interfacial tension at a level of $10^{-3}$ mN/m under the conditions of alkali-free and high mineralization degree, so that the crude oil recovery rate can be improved.

EMBODIMENTS OF THE INVENTION

While the present invention will be described in conjunction with specific Examples thereof, it is to be understood that the following Examples are presented by way of illustration only and not by way of limitation, and that numerous insubstantial modifications and adaptations of the invention may be made by those skilled in the art in light of the teachings herein.

The raw materials used in the Examples and comparative examples are, if not particularly limited, those having been disclosed in the prior art, or may be, for example, obtained as they are or prepared according to the processes disclosed in the prior art.

In the Examples and comparative examples, the dehydrated crude oil from Chengdong field of Shengli Oilfield having a viscosity of 44 mPa·s was used, and a density of 0.908 g/cm$^3$.

EXAMPLE 1

1. Synthesis of 4-Octylaniline Polyoxypropylene (30) Polyoxyethylene (16) Ether Sodium Disulfonate benzenesulfonate a) 1.0 mol of octyl benzene was added into a reactor equipped with a condensing device and a stirring device, 1.5 mol of 65% concentrated nitric acid and 20 g of 98% concentrated sulfuric acid were added dropwise, for which the reaction temperature was controlled to be 30° C., and after the dropwise addition, reaction was continued for 2 hours, to obtain 0.88 mol of 4-octyl nitrobenzene.

b) 0.88 mol of 4-octyl nitrobenzene was added into the reactor, 5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.85 mol of 4-octylaniline.

c) 0.85 mol of 4-octylaniline and 2.5 g of sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 25.5 mol of propylene oxide and 13.6 mol of ethylene oxide were sequentially and slowly introduced, and the pressure was controlled to be ≤0.40 MPa to carry out etherification reaction. After the reaction, the system was purged with nitrogen, cooled, neutralized and dehydrated to obtain 0.84 mol of 4-octylaniline polyoxypropylene (30) polyoxyethylene (16) ether.

d) 0.84 mol of 4-octylaniline polyoxypropylene (30) polyoxyethylene (16) ether synthesized in step c) was added into the reactor equipped with a condensing device, a dripping device and a stirring device, 3.0 mol of 20% fuming sulfuric acid was added dropwise, during which the reaction temperature was controlled to be 50° C., and after the dropwise addition, the reaction was continued for 1 hour, washed with water, extracted to remove the redundant acid, then sodium hydroxide was added into the organic phase to adjust the pH value to be 9, so as to obtain 0.78 mol of 4-octylaniline polyoxypropylene (30) polyoxyethylene (16) ether sodium disulfonate sodium benzenesulfonate.

2. Evaluation of Surfactant Properties
Formulation of Oil Displacement Agent

The oil displacement agent obtained by mixing 1 part by weight of the surfactant above and 399 parts by weight of seawater was used for interfacial tension evaluation and oil-flooding experiments. The compositions of the seawater used in all Examples and comparative examples of the present invention were shown in Table 1. The compositions of the oil displacement agents were shown in Table 2 for comparison.

Evaluation of Interfacial Tension:

The interfacial tension between the oil displacement agent and the dehydrated crude oil from Chengdong field of Shengli Oilfield was measured by using a TX-500C rotary drop interfacial tension tester produced by Texas university, USA at 80° C. and 4500 rpm, and the results were shown in Table 3.

EXAMPLE 2

1. Synthesis of 4-Dodecylaniline Polyoxyethylene (6) Ether Sodium Dicarboxylate Benzenesulfonate
   a) 1.0 mol of dodecyl benzene was added into a reactor equipped with a condensing device and a stirring device, 1.05 mol of 65% nitric acid and 50 g of 98% concentrated sulfuric acid were added dropwise, for which the reaction temperature was controlled to be 20° C., and after the dropwise addition, reaction was continued for 1 hour, to obtain 0.90 mol of 4-dodecyl nitrobenzene.
   b) 0.90 mol of 4-dodecyl nitrobenzene was added into the high-pressure reactor, 5.1 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.86 mol of 4-dodecylaniline.
   c) 0.86 mol of 4-dodecylaniline and 2.5 g sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 5.16 mol ethylene oxide was added slowly, and the pressure was controlled to be ≤0.40 MPa to carry out etherification reaction. After the reaction, the system was purged with nitrogen, cooled, neutralized and dehydrated to obtain 0.81 mol of 4-dodecylaniline polyoxyethylene (6) ether.
   The dodecylaniline polyoxyethylene (6) ether obtained was dissolved into a benzene solvent, sodium hydroxide was added according to a proportion of 1:3, alkalified for 1 hour at 60° C., and a carboxylation reagent sodium chloroacetate was added according to a proportion of 1:2.5, and reacted for 8 hours to obtain 0.75 mol of 4-dodecylaniline polyoxyethylene (6) ether sodium dicarboxylate.
   d) 0.75 mol of 4-dodecylaniline polyoxyethylene (6) ether sodium dicarboxylate synthesized in step c) was added into the reactor equipped with a condensing device, a dripping device and a stirring device, 3.0 mol of 20% fuming sulfuric acid was added dropwise, during which the reaction temperature was controlled to be 50° C., and after the dropwise addition, the reaction was continued for 1 hour, then sodium hydroxide was added to adjust the pH value to be 13, and a hydrolytic reaction was conducted for 2 hours, so as to obtain 0.70 mol of 4-dodecylaniline polyoxyethylene (6) ether sodium dicarboxylate sodium benzenesulfonate.

2. Evaluation of Surfactant Properties

The property evaluation method was the same as in Example 1 except for the different composition of the oil displacement agent. For comparison, the compositions of the oil displacement agents were shown in Table 2, and the evaluation results were shown in Table 3.

EXAMPLE 3

1. Synthesis of 2-Dodecyl-4-Octylaniline Polyoxypropylene (4) Polyoxyethylene (8) Ether Benzenesulfonate
   a) 1.0 mol of dodecyl octylbenzene was added into a reactor equipped with a condensing device and a stirring device, 1.2 mol of 65% nitric acid and 50 g of 98% concentrated sulfuric acid were added dropwise, for which the reaction temperature was controlled to be 20° C., and after the dropwise addition, reaction was continued for 1 hour, to obtain 0.91 mol of 2-dodecyl-4-octyl nitrobenzene.
   b) 0.95 mol of 2-dodecyl-4-octyl nitrobenzene was added into the high-pressure reactor, 5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.89 mol of 2-dodecyl-4-octylaniline.
   c) 0.89 mol of 2-dodecyl-4-octylaniline and 2.5 g sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 3.56 mol of propylene oxide and 7.12 mol of ethylene oxide were sequentially and slowly introduced, and the pressure was controlled to be ≤0.40 MPa to carry out etherification reaction. After the reaction, the system was purged with nitrogen, cooled, neutralized and dehydrated to obtain 0.85 mol of 2-dodecyl-4-octylaniline polyoxypropylene (4) polyoxyethylene (8) ether.
   d) 0.85 mol 2-dodecyl-4-octylaniline polyoxypropylene (4) polyoxyethylene (8) ether synthesized in step c) was added into the reactor equipped with a condensing device, a dripping device and a stirring device, 2.8 mol $SO_3$ was added dropwise, during which the reaction temperature was controlled to be 50° C., reacted for 2 hours, 10% aqueous sodium hydroxide was added dropwise to adjust the pH value of the system to be 12, and hydrolyzed at 80° C. for 2 hours, so as to obtain 0.74 mol 2-dodecyl-4-octylaniline polyoxypropylene (4) polyoxyethylene (8) ether sodium benzenesulfonate.

2. Evaluation of Surfactant Properties

The property evaluation method was the same as in Example 1 except for the different composition of the oil displacement agent. For comparison, the compositions of the oil displacement agents were shown in Table 2, and the evaluation results were shown in Table 3.

EXAMPLE 4

1. Synthesis of 4-Triacontylaniline Polyoxypropylene (6) Polyoxyethylene Ether (20) Benzenesulfonate
    a) 1.0 mol of triacontyl benzene was added into a reactor equipped with a condensing device and a stirring device, 1.1 mol of 65% nitric acid and 50 g of 98% concentrated sulfuric acid were added dropwise, for which the reaction temperature was controlled to be 20° C., and after the dropwise addition, reaction was continued for 1 hour, to obtain 0.86 mol of 4-triacontyl nitrobenzene.
    b) 0.86 mol of 4-triacontyl nitrobenzene was added into the high-pressure reactor, 5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.82 mol of 4-triacontylaniline.
    c) 0.82 mol of 4-triacontylaniline and 2.5 g sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 4.92 mol of propylene oxide and 16.4 mol of ethylene oxide were sequentially and slowly introduced, and the pressure was controlled to be ≤0.40 MPa to carry out etherification reaction. After the reaction, the system was purged with nitrogen, cooled, neutralized and dehydrated to obtain 0.78 mol of 4-triacontylaniline polyoxypropylene (6) polyoxyethylene (20) ether.
    d) 0.78 mol of 4-triacontylaniline polyoxypropylene (6) polyoxyethylene (20) ether synthesized in step c) was added into the reactor equipped with a condensing device, a dripping device and a stirring device, 4.0 mol of 98% sulfuric acid was added dropwise, during which the reaction temperature was controlled to be 50° C., and after the dropwise addition, the reaction was continued for 1 hour, then sodium hydroxide was added to adjust the pH value to be 13, and a hydrolytic reaction was conducted for 2 hours, so as to obtain 0.72 mol 4-triacontylaniline polyoxypropylene (6) polyoxyethylene (20) ether sodium disulfonate sodium benzenesulfonate.
2. Evaluation of Surfactant Properties The property evaluation method was the same as in Example 1 except for the different composition of the oil displacement agent. For comparison, the compositions of the oil displacement agents were shown in Table 2, and the evaluation results were shown in Table 3.

EXAMPLE 5

1. Synthesis of 4-Cetylaniline Polyoxyethylene (8) Dimethyl Ether Benzenesulfonate
    a) 1.0 mol of cetylbenzene was added into a reactor equipped with a condensing device and a stirring device, 1.2 mol of 65% nitric acid and 30 g of 98% concentrated sulfuric acid were added dropwise, for which the reaction temperature was controlled to be 20° C., and after the dropwise addition, reaction was continued for 1 hour, to obtain 0.87 mol of 4-cetyl nitrobenzene.
    b) 0.87 mol of 4-cetyl nitrobenzene was added into the high-pressure reactor, 5.5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.85 mol of 4-cetylaniline.
    c) 0.85 mol of 4-cetylaniline and 2.5 g sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under vacuum for 1 hour, then purged with nitrogen for 4 times to remove air in the system, and the reaction temperature of the system was adjusted to 150° C., then 6.8 mol ethylene oxide was added slowly, and the pressure was controlled to be ≤0.40 MPa to carry out etherification reaction. After the reaction, the system was purged with nitrogen, 2.4 mol of iodomethane was added, and reacted at 90° C. for 1 hour, cooled, neutralized and dehydrated to obtain 0.82 mol of 4-cetylaniline polyoxyethylene (8) dimethyl ether.
    d) 0.82 mol of 4-cetylaniline polyoxyethylene (8) dimethyl ether synthesized in step c) was added into the reactor equipped with a condensing device, a dripping device and a stirring device, 1.2 mol $SO_3$ was added, during which the reaction temperature was controlled to be 50° C., reacted for 1 hour, then sodium hydroxide was added to adjust the pH value to be 12, and a hydrolytic reaction was conducted for 2 hours, so as to obtain 0.74 mol of 4-cetylaniline polyoxyethylene (8) dimethyl ether sodium benzenesulfonate.
2. Evaluation of Surfactant Properties The property evaluation method was the same as in Example 1 except for the different composition of the oil displacement agent. For comparison, the compositions of the oil displacement agents were shown in Table 2, and the evaluation results were shown in Table 3.

EXAMPLE 6

1. Synthesis of 4-Octylaniline Polyoxybutylene (2) Polyoxypropylene (2) Polyoxyethylene (4) Ether benzenesulfonate
    a) 1.0 mol of octyl benzene was added into a reactor equipped with a condensing device and a stirring device, 1.5 mol of 65% concentrated nitric acid and 20 g of 98% concentrated sulfuric acid were added dropwise, for which the reaction temperature was controlled to be 30° C., and after the dropwise addition, reaction was continued for 2 hours, to obtain 0.87 mol of 4-octyl nitrobenzene.
    b) 0.87 mol of 4-octyl nitrobenzene was added into the high-pressure reactor, 5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.84 mol of 4-octylaniline.

c) 0.84 mol of 4-octylaniline and 2.5 g of sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 1.68 mol of butylene oxide, 1.68 mol of propylene oxide and 3.36 mol of ethylene oxide were sequentially and slowly introduced, and the pressure was controlled to be ≤0.40 MPa to carry out etherification reaction. After the reaction, the system was purged with nitrogen, cooled, neutralized and dehydrated to obtain 0.82 mol of 4-octylaniline polyoxybutylene (2) polyoxypropylene (2) polyoxyethylene (4) ether.

d) 0.82 mol 4-octylaniline polyoxybutylene (2) polyoxypropylene (2) polyoxyethylene (4) ether synthesized in step c) was added into the reactor equipped with a condensing device, a dripping device and a stirring device, 3.5 mol of 20% fuming sulfuric acid was added dropwise, during which the reaction temperature was controlled to be 50° C., and after the dropwise addition, reaction was continued for 1 hour, 10% aqueous sodium hydroxide was added dropwise to adjust the pH value of the system to be 12, and hydrolyzed at 80° C. for 2 hours, so as to obtain 0.73 mol of 4-octylaniline polyoxybutylene (2) polyoxypropylene (2) polyoxyethylene (4) ether sodium benzenesulfonate.

2. Evaluation of Surfactant Properties

The property evaluation method was the same as in Example 1 except for the different composition of the oil displacement agent. For comparison, the compositions of the oil displacement agents were shown in Table 2, and the evaluation results were shown in Table 3.

EXAMPLE 7

1. Synthesis of 4-Octylaniline Polyoxybutylene (2) Polyoxypropylene (2) Polyoxyethylene (4) Ether-3,5-Sodium Disulfonate a) 1.0 mol of octyl benzene was added into a reactor equipped with a condensing device and a stirring device, 5 mol of fuming nitric acid was added dropwise, for which the reaction temperature was controlled to be 50° C., and after the dropwise addition, reaction was continued for 4 hours, to obtain 0.85 mol of 4-octyl nitrobenzene.

b) 0.85 mol of 4-octyl nitrobenzene was added into the reactor, 5 g of 10% palladium on carbon was added, and the reactor was sealed. Nitrogen was introduced for replacement for 5 times, then hydrogen was introduced for replacement for 5 times, heated to 60° C., hydrogenation was started, and the system pressure was controlled to be 1-4 MPa, for reaction for 6 hours to obtain 0.82 mol of 4-octylaniline.

c) 0.82 mol of 4-octylaniline and 2.5 g of sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under a pressure of −0.08 MPa for 1 hour, then purged with nitrogen for 4 times to remove air in the system, and the reaction temperature of the system was adjusted to 150° C., then 1.86 mol of butylene oxide, 1.86 mol of propylene oxide and 3.72 mol of ethylene oxide were sequentially and slowly introduced, and the pressure was controlled to be ≤0.40 MPa to carry out etherification reaction. After the reaction, the system was purged with nitrogen, cooled, neutralized and dehydrated to obtain 0.81 mol of 4-octylaniline polyoxybutylene (2) polyoxypropylene (2) polyoxyethylene (4) ether.

d) 0.81 mol 4-octylaniline polyoxybutylene (2) polyoxypropylene (2) polyoxyethylene (4) ether synthesized in step c) was added into the reactor equipped with a condensing device, a dripping device and a stirring device, 3.0 mol of $SO_3$ was added, during which the reaction temperature was controlled to be 60° C., reacted for 2 hours, then 10% aqueous sodium hydroxide was added dropwise to adjust the pH value of the system to be 12, and hydrolyzed at 80° C. for 2 hours, so as to obtain 0.75 mol of 4-octylaniline polyoxybutylene (2) polyoxypropylene (2) polyoxyethylene (4) ether-3,5-sodium disulfonate.

2. Evaluation of Surfactant Properties

The property evaluation method was the same as in Example 1 except for the different composition of the oil displacement agent. For comparison, the compositions of the oil displacement agents were shown in Table 2, and the evaluation results were shown in Table 3.

EXAMPLE 8

According to the test of the physically simulated oil-flooding effect of the complex oil-flooding system in the SY/T6424-2000 complex oil-flooding system performance test method, dehydrated crude oil from Chengdong field of Shengli Oilfield wa used for a simulated oil-flooding experiment on a rock core with a length of 30 cm, a diameter of 2.5 cm and a permeability of 1.5 $m^2$ at atemperature of 80° C. Firstly, seawater was used to carry out water flooding until the water content was 98%, and after the water flooding was finished, 0.3 pv (core pore volume) of the oil flooding agent was injected, then water flooding was carried out until the water content was 98%, and the improved crude oil recovery ratio was calculated.

Oil-flooding experiments and evaluations were carried out on the oil-flooding agents prepared in Example 2 and Example 5 according to the above methods, and the results showed respectively 10.1% and 12.8% of enhanced oil recovery.

Comparative Example 1

The evaluation method was the same as Example 2 except that sodium petroleum sulfonate (Daqing refinery) was used instead of the dodecylanline polyoxyethylene (6) ether sodium benzenesulfonate surfactant in Example 1, and the others were the same, and it was determined that an interfacial tension of 0.024 mN/m was formed between the composition and dehydrated crude oil from Chengdong field of Shengli Oilfield.

Oil-flooding same as Example 6 was carried out, and a yield of the crude oil was measured to be enhanced by 3.8%.

Comparative Example 2

$C_{16-18}$ alkylbenzenesulfonate was synthesized according to the method of Example 1 in patent CN 200410096431.9, evaluation method was the same as Example 1, and it was determined that an interfacial tension of 0.012 mN/m was formed between the composition and dehydrated crude oil from Chengdong field of Shengli Oilfield.

Oil-flooding same as Example 6 was carried out, and a yield of the crude oil was measured to be enhanced by 4.5%.

Comparative Example 3

It was same as in Example 5, except that the starting material for the etherification reaction was different, where aniline was used.

0.1 mol of aniline and 2.5 g sodium hydroxide were charged into the reactor equipped with a condensing device, a stirring device and a gas disperser, heated to 85° C. under continuous feeding of nitrogen gas, and reacted for 1 hour under stirring. The vacuum system was started, dehydrated at a temperature of 90° C. under vacuum for 1 hour, then purged with nitrogen for 4 times to remove air in the system, and the reaction temperature of the system was adjusted to 150° C., then 7.20 mol ethylene oxide was added slowly, and the pressure was controlled to be ≤0.40 MPa to carry out etherification reaction. After the reaction, the system was purged with nitrogen, 2.4 mol of iodomethane was added, and reacted at 90° C. for 1 hour, cooled, neutralized and dehydrated to obtain aniline polyoxyethylene (8) cetyl ether.

The aniline polyoxyethylene (8) cetyl ether was added into the reactor equipped with a condensing device, a dripping device and a stirring device, 3.0 mol of 50% fuming sulfuric acid was added, during which the reaction temperature was controlled to be 55° C., and after the dropwise addition, the reaction was continued for 1 hour, then sodium hydroxide was added to adjust the pH value to be 10, and a hydrolytic reaction was conducted for 2 hours, so as to obtain aniline polyoxyethylene (8) cetyl ether sodium benzenesulfonate.

Oil-flooding same as Example 6 was carried out, and a yield of the crude oil was measured to be enhanced by 5.3%.

Comparative Example 4

The process of Example 5 was repeated, except that amylbenzene was used replacing cetyl benzene, while other conditions remained unchanged.

Oil-flooding same as Example 6 was carried out, and a yield of the crude oil was measured to be enhanced by 3.21.

TABLE 1

| Sea Water Item, mg/L | | | | | | | |
|---|---|---|---|---|---|---|---|
| $Na^+ + K^+$ | $Mg^{2+}$ | $Ca^{2+}$ | $Cl^-$ | $SO_4^{2-}$ | $HCO_3^-$ | $CO_3^{2-}$ | TDS |
| 10369 | 1196 | 425 | 18215 | 1011 | 162 | 0 | 31378 |

TABLE 2 compositions of the oil displacement agents of Examples 1-5

| Examples | Structural parameters | Surfactant Parts by weight | Seawater, Parts by weight |
|---|---|---|---|
| 1 | $R_1 = C_8$, $R_2 = H$, $R_3 = $ —$SO_3Na$, $n = 1$, $x_1 + x_2 = 30$, $y_1 + y_2 = 16$, $z_1 + z_2 = 0$, $M = Na$ | 1 | 399 |
| 2 | $R_1 = C_{12}$, $R_2 = H$, $R_3 = $ —$CH_2COONa$, $n = 1$, $x_1 + x_2 = 0$, $y_1 + y_2 = 6$, $z_1 + z_2 = 0$, $M = Na$ | 1 | 199 |
| 3 | $R_1 = C_{12}$, $R_2 = C_8$, $R_3 = H$, $n = 1$, $x_1 + x_2 = 4$, $y_1 + y_2 = 8$, $z_1 + z_2 = 0$, $M = Na$ | 1 | 500 |
| 4 | $R_1 = C_{30}$, $R_2 = H$, $R_3 = $ —$SO_3Na$, $n = 1$, $x_1 + x_2 = 6$, $y_1 + y_2 = 20$, $z_1 + z_2 = 0$, $M = Na$ | 1 | 80 |
| 5 | $R_1 = C_{16}$, $R_2 = H$, $R_3 = $ —$CH_3$, $n = 1$, $x_1 + x_2 = 0$, $y_1 + y_2 = 8$, $z_1 + z_2 = 0$, $M = Na$ | 1 | 200 |
| 6 | $R_1 = C_8$, $R_2 = H$, $R_3 = H$, $n = 1$, $x_1 + x_2 = 2$, $y_1 + y_2 = 4$, $z_1 + z_2 = 2$, $M = Na$ | 1 | 200 |
| 7 | $R_1 = C_8$, $R_2 = $ —$SO_3Na$, $R_3 = H$, $n = 1$, $x_1 + x_2 = 2$, $y_1 + y_2 = 4$, $z_1 + z_2 = 2$, $M = Na$ | 1 | 200 |

TABLE 3 interfacial tension properties of the oil displacement agents of Examples 1-5

| Examples | Interfacial tension (mN/m) |
|---|---|
| 1 | 0.0078 |
| 2 | 0.0035 |
| 3 | 0.0084 |
| 4 | 0.0063 |
| 5 | 0.00011 |
| 6 | 0.0023 |
| 7 | 0.012 |

The invention claimed is:

1. An alkyl polyether aminobenzenesulfonate, having a structural formula of formula (I):

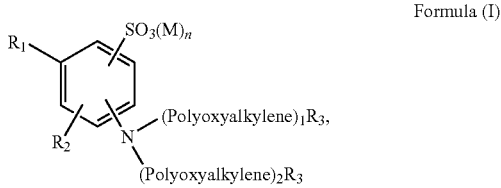

Formula (I)

in Formula (I):
R$_1$ and R$_2$ are not H at the same time and are independently selected from the group consisting of H, C$_1$-C$_{40}$ hydrocarbyl group, and

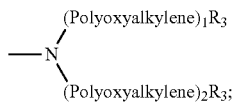

R$_3$ was independently selected at each occurrence from the group consisting of H, C$_1$-C$_{10}$ hydrocarbyl group, C$_1$-C$_{10}$ carbonyl group, C$_1$-C$_{10}$ alkylsulfonic group, C$_1$-C$_{10}$ alkylolsulfonic group, C$_1$-C$_{10}$ alkylcarboxylic group, and —SO$_3$(M)$_n$;
-(Polyoxyalkylene)$_1$- is at least one of —(PO)$_{x1}$—, -(EO)$_{y1}$—, —(BO)$_{z1}$—;
-(Polyoxyalkylene)$_2$- is at least one of —(PO)$_{x2}$—, -(EO)$_{y2}$—, —(BO)$_{z2}$—;
x$_1$, x$_2$, y$_1$, y$_2$, z$_1$, and z$_2$ are each independently selected from any integer between 0 and 50, and x$_1$+x$_2$=0-50, y$_1$+y$_2$=1-50, and z$_1$+z$_2$=0-50;
M is selected from the group consisting of alkali metals and alkaline earth metals, wherein n is 1 when M is an alkali metal, and n is 0.5 when M is an alkaline earth metal; and
wherein PO is propoxy, EO is ethoxy, and BO is butoxy.

2. The alkyl polyether aminobenzenesulfonate according to claim 1, wherein, in Formula (I),
R$_1$ is a C$_6$-C$_{30}$ hydrocarbyl group,
R$_2$ is H, a C$_1$-C$_{30}$ hydrocarbyl group, or

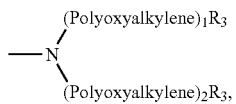

and
R$_3$ is independently at each occurrence H, —CH$_3$, —CH$_2$CH$_3$, —CH$_2$SO$_3$(M)$_n$, —CH$_2$(CHOH)SO$_3$(M)$_n$, —CH$_2$COO(M)$_n$, or —SO$_3$(M)$_n$, wherein x$_1$+x$_2$=0-30, y$_1$+y$_2$=1-30, and z$_1$+z$_2$=0-30.

3. The alkyl polyether aminobenzenesulfonate according to claim 1, wherein in Formula (I):
R$_1$ is a C$_6$-C$_{20}$ hydrocarbyl group;
R$_2$ is H or a C$_1$-C$_{30}$ hydrocarbyl group;
R$_3$ at each occurrence is independently H, —CH$_3$, or —CH$_2$CH$_3$;
x$_1$+x$_2$=0-20; y$_1$+y$_2$=1-20; z$_1$+z$_2$=0-20; and
M is selected from the group consisting of sodium ion, potassium ion, calcium ion, and magnesium ion.

4. The alkyl polyether aminobenzenesulfonate according to claim 3, wherein in formula (I), R$_1$ is a C$_6$-C$_{20}$ alkyl or alkenyl group; x$_1$+x$_2$=2-10; y$_1$+y$_2$=2-20; and z$_1$+z$_2$=2-10.

5. The alkyl polyether aminobenzenesulfonate according to claim 1, wherein in Formula (I), R$_1$ or R$_2$ is

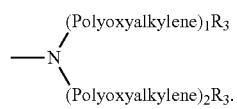

6. The alkyl polyether aminobenzenesulfonate according to claim 1, wherein all occurrences of R$_3$ are the same.

7. The alkyl polyether aminobenzenesulfonate according to claim 1, wherein R$_3$ is —SO$_3$(M)$_n$.

8. A surfactant composition comprising one or more of the alkyl polyether aminobenzenesulfonates according to claim 1.

9. A process for producing the alkyl polyether aminobenzenesulfonate according to claim 1, comprising the steps of:
step 1, reacting alkylaniline serving as an initiator with an epoxy compound, and optionally performing blocking treatment on the reaction product by using a blocking agent, to obtain alkyl polyether aminobenzene;
step 2, sulfonating the alkyl polyether aminobenzene by using a sulfonating reagent to obtain the alkyl polyether aminobenzenesulfonate.

10. The process according to claim 9, wherein the alkylaniline is R$_1$-Ph-NH$_2$,
wherein Ph represents phenyl and R$_1$ is selected from the group consisting of H, C$_1$-C$_{40}$ hydrocarbyl group, and

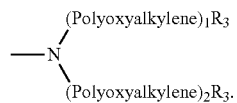

11. The process according to claim 9, wherein Step 1 further comprises:
nitrating alkylbenzene to obtain alkyl nitrobenzene; and
hydrotreating the alkyl nitrobenzene to obtain the alkylaniline.

12. The process according to claim 11, wherein the alkylbenzene is nitrated with a nitrating agent and optionally an activator, wherein the nitrating agent is selected from the group consisting of nitric acid and dinitrogen pentoxide, and the activator is selected from the group consisting of concentrated sulfuric acid, glacial acetic acid, acetic anhydride, and phosphorus pentoxide.

13. The process according to claim 12, wherein a molar ratio of the nitrating reagent to alkylbenzene is (1-5):1; and/or
the nitrating is carried out at 0-80° C. for 1-10 hours.

14. The process according to claim 11, wherein hydrotreating is carried out in the presence of a hydrogenation catalyst selected from the group consisting of palladium on carbon and Raney nickel; and/or
the hydrogenation catalyst is in an amount of 0.1-10 wt %, relative to the alkyl nitrobenzene; and/or
the hydrotreating is carried out at 20 to 150° C. under 0 to 5 MPa.

15. The process according to claim 9, wherein in step 1, the epoxy compound is selected from C$_2$-C$_6$ epoxy compounds, and/or a molar ratio of the epoxy compound to the alkylaniline is (1-150): 1, and/or step 1 is carried out in the presence of a basic catalyst at a reaction temperature of 140-200° C. and under a reaction pressure of 0-5 MPa.

16. The process according to claim 15, wherein in step 1, the epoxy compound is propylene oxide or ethylene oxide;

the molar ratio of the epoxy compound to the alkylaniline is (1-40): 1; and/or the basic catalyst is selected from the group consisting of alkali metals, alkali metal hydroxides, alkaline earth metal hydroxides, alkali metal alcoholates and alkali metal oxides, and the basic catalyst is in an amount of 0.1 wt % to 10 wt % of a total weight of the reactants.

17. The process according to claim 9, wherein in step 1, the blocking agent is $R'_3$—X or $R''_3$—X'—$R''_3$, wherein $R'_3$ is a $C_1$-$C_{10}$ hydrocarbyl group or $C_1$-$C_{10}$ carbonyl group, X is a halogen or hydroxyl, with the proviso that when X is hydroxyl, $R'_3$ is a $C_1$-$C_{10}$ carbonyl group;

$R''_3$ is selected from $C_1$-$C_{10}$ carbonyls and X' is O; $R'_3$ is a $C_1$-$C_{10}$ alkyl, alkenyl or phenylalkyl group; and, a molar ratio of the blocking agent to the alkylaniline is (2-2.6): 1.

18. The process according to claim 9, wherein the sulfonating agent is selected from the group consisting of concentrated sulfuric acid, fuming sulfuric acid, and sulfur trioxide.

19. The process according to claim 9, wherein step 2 further comprises:

carrying out sulfonation of the alkyl polyether aminobenzene with a sulfonating agent at 20-80° C. for 0.5-10 hours;

adjusting the pH value of the sulfonation product to 10-14, and performing hydrolysis reaction of the sulfonation product for 0.5-5 hours to obtain the alkyl polyether aminobenzenesulfonate.

20. An enhanced oil recovery agent composition, comprising the alkyl polyether aminobenzenesulfonate according to claim 1 as a surfactant and water, wherein a weight ratio of the surfactant to the water is 1:(50-2000).

* * * * *